(12) United States Patent
Sahlin et al.

(10) Patent No.: US 10,517,112 B2
(45) Date of Patent: Dec. 24, 2019

(54) UPLINK SUBFRAME SHORTENING IN TIME-DIVISION DUPLEX (TDD) SYSTEMS

(71) Applicant: Telefonaktiebolaget L M Ericsson (publ), Stockholm (SE)

(72) Inventors: Henrik Sahlin, Mölnlycke (SE); Johan Furuskog, Stockholm (SE); Stefan Parkvall, Bromma (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 946 days.

(21) Appl. No.: 14/407,793

(22) PCT Filed: Dec. 4, 2013

(86) PCT No.: PCT/SE2013/051449
§ 371 (c)(1),
(2) Date: Dec. 12, 2014

(87) PCT Pub. No.: WO2015/084226
PCT Pub. Date: Jun. 11, 2015

(65) Prior Publication Data
US 2016/0278117 A1    Sep. 22, 2016

(51) Int. Cl.
*H04W 72/14* (2009.01)
*H04B 7/26* (2006.01)
(Continued)

(52) U.S. Cl.
CPC .......... *H04W 72/14* (2013.01); *H04B 7/2615* (2013.01); *H04W 72/0446* (2013.01); *H04W 72/0413* (2013.01); *H04W 72/12* (2013.01)

(58) Field of Classification Search
CPC .............. H04B 7/2615; H04W 72/14; H04W 72/0446; H04W 72/042; H04W 72/04;
(Continued)

(56) References Cited

U.S. PATENT DOCUMENTS 7,769,094 B2    8/2010  Wilhelmsson et al.
2005/0259629 A1  11/2005  Oliver et al.
(Continued)

FOREIGN PATENT DOCUMENTS

EP    0948147 A1    10/1999
EP    1793635 A1    6/2007
(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 11)", 3GPP TS 36.212 V11.3.0, Jun. 2013, 1-84.
(Continued)

*Primary Examiner* — Oussama Roudani
(74) *Attorney, Agent, or Firm* — Murphy, Bilak & Homiller, PLLC

(57) ABSTRACT

A guard period for switching between uplink and downlink subframes is created by shortening an uplink subframe, i.e., by not transmitting during one or more symbol intervals at the beginning of the subframe interval. A grant message includes signaling indicating when a shortened subframe should be transmitted. An example method is implemented in a first wireless node configured to transmit data in transmit subframes occurring at defined subframe intervals and having a predetermined number of symbol intervals. This example method includes determining (1620) that a transmit subframe is to be shortened, relative to the predetermined number of symbol intervals and, in response to this determination, shortening (1630) transmission of the transmit subframe by not transmitting during a beginning portion of the subframe interval for the transmit subframe and transmitting during the remainder of the subframe interval.

14 Claims, 16 Drawing Sheets

(51) Int. Cl.
*H04W 72/04* (2009.01)
*H04W 72/12* (2009.01)

(58) Field of Classification Search
CPC .............. H04W 72/082; H04W 72/12; H04W 72/1284; H04W 56/001
See application file for complete search history.

(56) References Cited

U.S. PATENT DOCUMENTS

| | | |
|---|---|---|
| 2009/0201838 A1 | 8/2009 | Zhang et al. |
| 2011/0044255 A1 | 2/2011 | Ikeda et al. |
| 2011/0149813 A1 | 6/2011 | Parkvall et al. |
| 2012/0014477 A1 | 1/2012 | Ko et al. |
| 2012/0069794 A1 | 3/2012 | Kim et al. |
| 2012/0294206 A1 | 11/2012 | Zhang et al. |
| 2013/0114505 A1 | 5/2013 | Haim et al. |
| 2013/0170568 A1 | 7/2013 | Prihed et al. |
| 2013/0286907 A1* | 10/2013 | Wei ............... H04L 5/001 370/281 |
| 2013/0301570 A1* | 11/2013 | Xu ............... H04L 5/0073 370/329 |
| 2014/0036718 A1* | 2/2014 | Gao ............... H04W 72/121 370/254 |
| 2014/0092793 A1 | 4/2014 | Yang et al. |
| 2015/0003272 A1 | 1/2015 | Hu et al. |
| 2015/0295743 A1 | 10/2015 | Hwang et al. |

FOREIGN PATENT DOCUMENTS

| | | |
|---|---|---|
| JP | 2010507994 A | 3/2010 |
| JP | 2010525633 A | 7/2010 |
| JP | 2012518363 A | 8/2012 |
| JP | 2013187738 A | 9/2013 |
| RU | 2454037 C2 | 6/2012 |
| WO | 2012051756 A1 | 4/2012 |
| WO | 2012071689 A1 | 6/2012 |
| WO | 2013141770 A1 | 9/2013 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.

Unknown, Author, "Dynamic reconfiguration of TDD UL-DL configuration", Samsung, 3GPP TSG RAN WG1 Meeting #69, R1-122267, Prague, Czech Republic, May 21-25, 2012, 1-2.

Unknown, Author, "Frame structure design and analyze of OFDM TDD for LTE", Catt et al., 3GPP TSG RAN WG1#42bis, R1-051178, San Diego, USA, Oct. 10-14, 2005, 1-9.

* cited by examiner

UPLINK SUBFRAME SHORTENING IN TIME-DIVISION DUPLEX (TDD) SYSTEMS

TECHNICAL FIELD

The technology disclosed herein relates generally to wireless communication systems, and more particularly relates to techniques for modifying subframe lengths in time-division duplex (TDD) systems.

BACKGROUND

In a typical cellular radio system, end-user radio or wireless terminals, also known as mobile stations and/or user equipment units (UEs), communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" or an "eNodeB". A cell is a geographical area where radio coverage is provided by the radio base station equipment at a base station site. Each cell is identified by an identity within the local radio area, which is broadcasted in the cell. The base stations communicate over the air interface operating on radio frequencies with the user equipment units (UEs) within range of the base stations.

In some radio access networks, several base stations may be connected, e.g., by landlines or microwave links, to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is a radio access network that uses wideband code-division multiple access (W-CDMA) for communications between the UEs and the base stations, referred to in UTRAN standards as NodeB's.

In a forum known as the 3$^{rd}$ Generation Partnership Project (3GPP), telecommunications suppliers propose and agree upon standards for third generation networks generally and UTRAN specifically, and investigate techniques to enhance wireless data rates and radio capacity. 3GPP has undertaken to evolve further the UTRAN and GSM based radio access network technologies. Several releases for the Evolved Universal Terrestrial Radio Access Network (E-UTRAN) specification have issued, and the standards continue to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network, via Access Gateways (AGWs), rather than to radio network controller (RNC) nodes. In general, in LTE systems the functions of a radio network controller (RNC) node are distributed between the radio base stations nodes, referred to in the specifications for LTE as eNodeB's, and AGWs. As a result, the radio access network (RAN) of an LTE system has what is sometimes termed a "flat" architecture, including radio base station nodes that do not report to radio network controller (RNC) nodes.

Transmission and reception from a node, e.g., a radio terminal like a UE in a cellular system such as LTE, can be multiplexed in the frequency domain or in the time domain, or combinations thereof. In Frequency-Division Duplex (FDD) systems, as illustrated to the left side in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD can operate in unpaired frequency spectrum, whereas FDD requires paired frequency spectrum.

Typically, a transmitted signal in a communication system is organized in some form of frame structure. For example, LTE uses ten equally-sized subframes 0-9 of length 1 millisecond per radio frame as illustrated in FIG. 2.

In the case of FDD operation, illustrated in the upper part of FIG. 2, there are two carrier frequencies, one for uplink transmission ($f_{UL}$) and one for downlink transmission ($f_{DL}$). At least with respect to the radio terminal in a cellular communication system, FDD can be either full duplex or half duplex. In the full duplex case, a terminal can transmit and receive simultaneously, while in half-duplex operation (see FIG. 1) the terminal cannot transmit and receive simultaneously (although the base station is capable of simultaneous reception/transmission, i.e., receiving from one terminal while simultaneously transmitting to another terminal). In LTE, a half-duplex radio terminal monitors/receives in the downlink except when explicitly instructed to transmit in the uplink in a particular subframe.

In the case of TDD operation (illustrated in the lower part of FIG. 2), there is only a single carrier frequency, $F_{UL/DL}$, and uplink and downlink transmissions are separated in time also on a cell basis. Because the same carrier frequency is used for uplink and downlink transmission, both the base station and the mobile terminals need to switch from transmission to reception and vice versa. An important aspect of a TDD system is to provide a sufficiently large guard time where neither downlink nor uplink transmissions occur in order to avoid interference between uplink and downlink transmissions. For LTE, special subframes (subframe 1 and, in some cases, subframe 6) provide this guard time. A TDD special subframe is split into three parts: a downlink part (DwPTS), a guard period (GP), and an uplink part (UpPTS). The remaining subframes are either allocated to uplink or downlink transmission.

Time division duplex (TDD) allows for different asymmetries in terms of the amount of resources allocated for uplink and downlink transmission, respectively, by means of different downlink/uplink configurations. In LTE, there are seven different configurations as shown in FIG. 3. Each configuration has a differing proportion of downlink and uplink subframe in each 10-millisecond radio frame. For instance, Configuration 0, illustrated at the top of the figure, has two downlink subframes and three uplink subframes in each 5-millisecond half-frame, as indicated by the notation "DL:UL 2:3". Configurations 0, 1, and 2 have the same arrangement in each of the 5-millisecond half-frames in the radio frame, while the remaining configurations do not. Configuration 5, for example has only a single uplink subframe, and nine downlink subframes, as indicated by the notation "DL:UL 9:1." The configurations provide a range of uplink/downlink ratios so that the system can choose the configuration that best matches the anticipated traffic load.

To avoid significant interference between downlink and uplink transmissions between different cells, neighbor cells should have the same downlink/uplink configuration. Otherwise, uplink transmission to base station 2, BS2, in one cell may interfere with downlink transmission from base station 1, BS1, in the neighboring cell (and vice versa), as illustrated in FIG. 4 where the uplink transmission of the UE in the right cell, identified in the figure as mobile station 1, MS1, is interfering with the downlink reception by the UE in the left cell, MS2. As a result, the downlink/uplink asymmetry does not vary between cells. The downlink/uplink asymmetry configuration is signaled as part of the system information and remains fixed for a long period of time.

In LTE, the downlink is based on Orthogonal Frequency-Division Multiplexing (OFDM) while the uplink is based on Discrete-Fourier-Transform-spread (DFT-spread) OFDM, also known as Single-Carrier Frequency-Division Multiple Access (SC-FDMA). Details may be found in the 3GPP document "Evolved Universal Terrestrial Radio Access (E-UTRA); Physical channels and modulation," 3GPP TS 36.211, V11.3.0, available at www.3gpp.org. The transmission-time interval (TTI) equals a subframe of 1 millisecond, which is made up of 14 OFDM symbol intervals in downlink and 14 SC-FDMA symbol intervals in uplink, given a cyclic prefix of normal length. Portions of the OFDM and SC-FDMA symbols transmitted in these symbol intervals are used to carry user data in physical channels referred to as the Physical Downlink Shared Channel (PDSCH) and Physical Uplink Shared Channel (PUSCH). In future wireless communication systems, the length of a subframe might be significantly reduced in order to reduce user data delays. Furthermore, in future wireless systems both downlink and uplink might be based on OFDM.

Important priorities for the evolution of current wireless systems and the development of future wireless communication systems are higher bitrates and shorter delays, especially as applied to small cell scenarios. Higher bitrates can be achieved by using higher carrier frequencies, for example, where wideband spectrum resources are available. Also, TDD (Time Division Duplex) has attained an increased interest. With a dynamic TDD system, i.e., a system where the TDD configuration is not necessarily static from one frame to the next, the downlink or uplink bitrate can be instantaneously increased by adaptively changing the relation between number of intervals used for downlink (from eNodeB to UE) and uplink (UE to eNodeB). Within small cells, the propagation delays will be small, such that small guard periods can be used when switching from downlink to uplink. Accordingly, improved techniques for switching between downlink and uplink in a dynamic TDD system, while maintaining minimal interference between downlink and uplink transmissions and keeping control signaling to a minimum, are required.

SUMMARY

A fixed relation between uplink and downlink in a Time-Division Duplexing (TDD) system results in an inflexible utilization of the radio resources. However, with a dynamic TDD system, the amount of control signaling might increase significantly if all user equipment (UEs) must be notified of which subframes are used as downlink and uplink subframes. In particular, if a guard period for switching between uplink and downlink is created by omitting one or several OFDM symbols in a downlink subframe, then the eNodeB needs to send control messages informing all UEs that the last OFDM symbols of a subframe are omitted. This requires a large signaling overhead.

An alternative is that UEs might be required to blindly detect whether one or several of the last OFDM symbols are omitted. However, another UE might transmit in the uplink during these last downlink OFDM symbols, causing interference if the UEs are not well mutually isolated. This interference can result in unreliable detection of whether OFDM symbols have been omitted from downlink subframes, causing performance degradations.

In various embodiments of the present invention, a guard period for switching between uplink and downlink subframes is created by shortening an uplink subframe. This is done by omitting one or more symbols at the beginning of an uplink subframe transmission interval, i.e., by not transmitting during one or more symbol intervals at the beginning of the subframe interval. Signaling is included in an uplink grant message sent to the UE, the signaling indicating when the UE should transmit a subframe that is one or several OFDM (or SC-FDMA symbols) shorter than a normal subframe, and where the transmission of this subframe starts one or several OFDM (or SC-FDMA) symbols delayed compared to a normal subframe.

While several embodiments are described below in the context of an LTE system, where the uplink corresponds to transmissions from a UE to an eNodeB, it should be appreciated that the disclosed techniques may be applied to other wireless systems, and do not necessarily depend on the particular hierarchical arrangement between the LTE eNodeB and UE.

Accordingly, one example method according to the techniques disclosed herein is suitable for implementation in a first wireless node configured to transmit data in transmit subframes occurring at defined subframe intervals and having a predetermined length, e.g., including a predetermined number of symbol intervals. In an LTE system, the first wireless node is a UE, and the subframes are uplink subframes. This example method includes determining that a transmit subframe is to be shortened, relative to the predetermined length and, in response to this determination, shortening transmission of the transmit subframe by not transmitting during a beginning portion of the subframe interval for the transmit subframe and transmitting during the remainder of the subframe interval. In some embodiments, such as in an LTE system, the predetermined duration is a predetermined number of symbol intervals and shortening transmission of the subframe is done by not transmitting during one or more symbol intervals at the beginning of the transmit subframe.

In some embodiments, the first wireless node determines that the first transmit subframe is to be shortened by receiving, from a second wireless node, a grant message containing subframe-shortening information, the subframe-shortening information indicating that the transmit subframe is to be shortened. The subframe-shortening information may consist of a single bit indicating that the transmit subframe is to be shortened by a predetermined number of symbols, for example, or may include multiple bits indicating a number of symbols to be omitted from the transmit subframe. In other embodiments or in other instances, the first wireless node may determine that the transmit subframe is to be shortened without explicit signaling from the second wireless node, e.g., by determining that a scheduled broadcast subframe is to be received in a receive subframe preceding and overlapping the transmit subframe.

Another example method is suitable for implementation in a wireless node that is configured to receive data in receive subframes occurring at defined subframe intervals and having a predetermined duration. In an LTE system, this node may be an LTE eNodeB, and the receive subframes are again uplink subframes. This example method includes transmitting to a second wireless node, e.g., an LTE UE, a grant message that contains subframe-shortening information. The subframe-shortening information indicates that a subframe transmitted by the second wireless node during a first subframe interval is to be shortened. Subsequently, the wireless node receives a shortened subframe from the second wireless node, during the first subframe interval, where the shortened subframe is shortened, relative to the predetermined length. Once again, this subframe-shortening information may consist of a single bit indicating that the subframe transmitted during the first subframe interval is to be shortened by omitting a predetermined number of symbols from the beginning of the transmitted subframe, or may include multiple bits indicating a specific number of symbols to be omitted from the transmitted subframe.

Corresponding apparatus, i.e., wireless nodes configured to carry out one or more of the methods summarized above are also described in detail in the description that follows.

As noted above, a guard period must always be included in TDD systems, because the UE cannot transmit and receive simultaneously. If omitting one or more symbols from the beginning of the uplink subframe is used to provide the guard period, then only the UE which transmits in uplink has to be aware of this switch from downlink to uplink. A control message included in the uplink grant contributes a very small extra amount of control signaling overhead, and can be received by the UE in a subframe other than the subframe that is shortened. The techniques and apparatus disclosed herein can therefore be used to provide a robust system for dynamic TDD switching, without the need for blind detection of the switch from downlink to uplink and with low signaling load.

Of course, the present invention is not limited to the above features and advantages. Indeed, those skilled in the art will recognize additional features and advantages upon reading the following detailed description, and upon viewing the accompanying drawings.

DETAILED DESCRIPTION

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
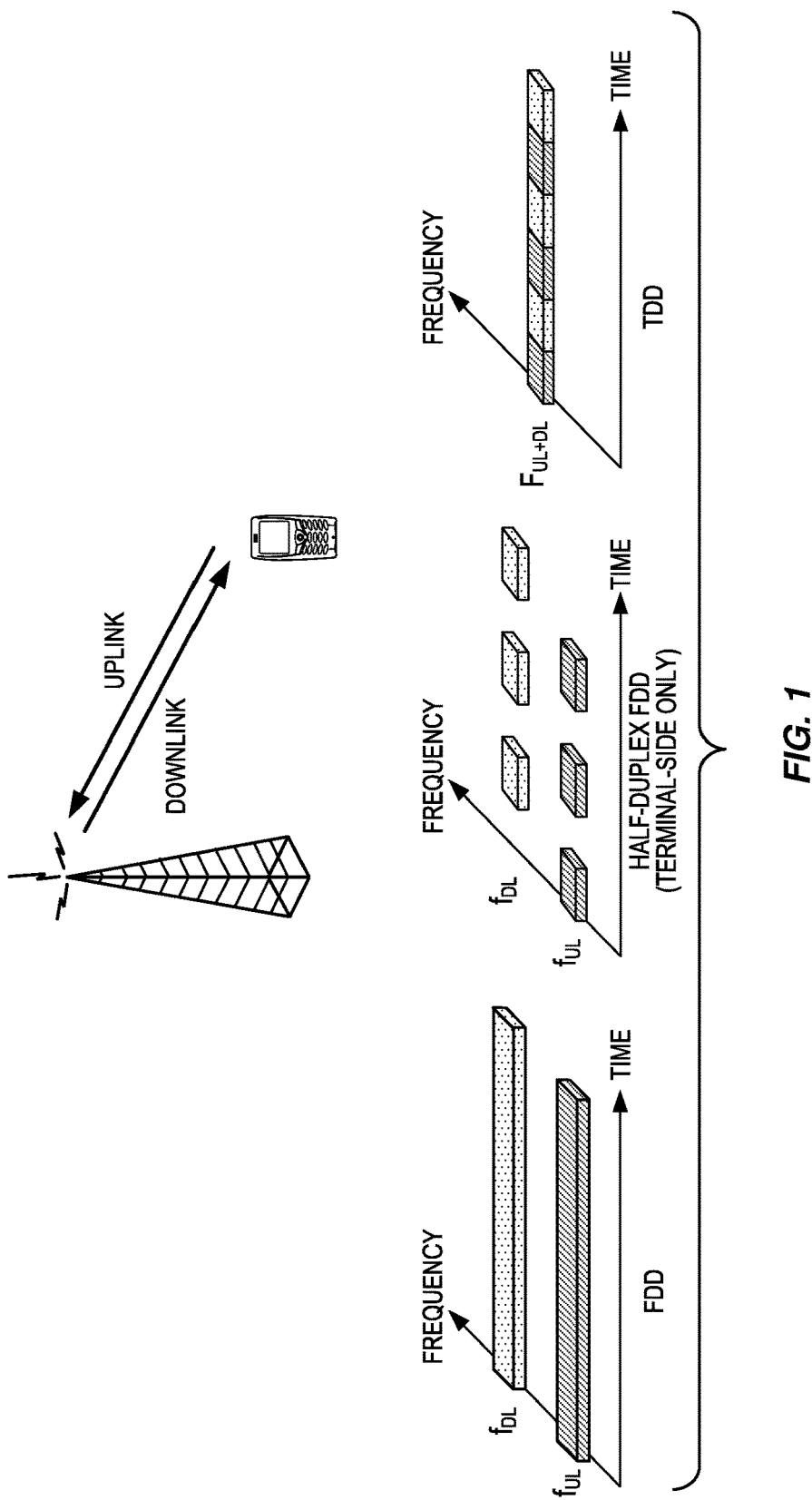
FIG. 1 illustrates frequency-division duplex, half-duplex frequency division, and time-division duplex transmissions.
Figure 2:
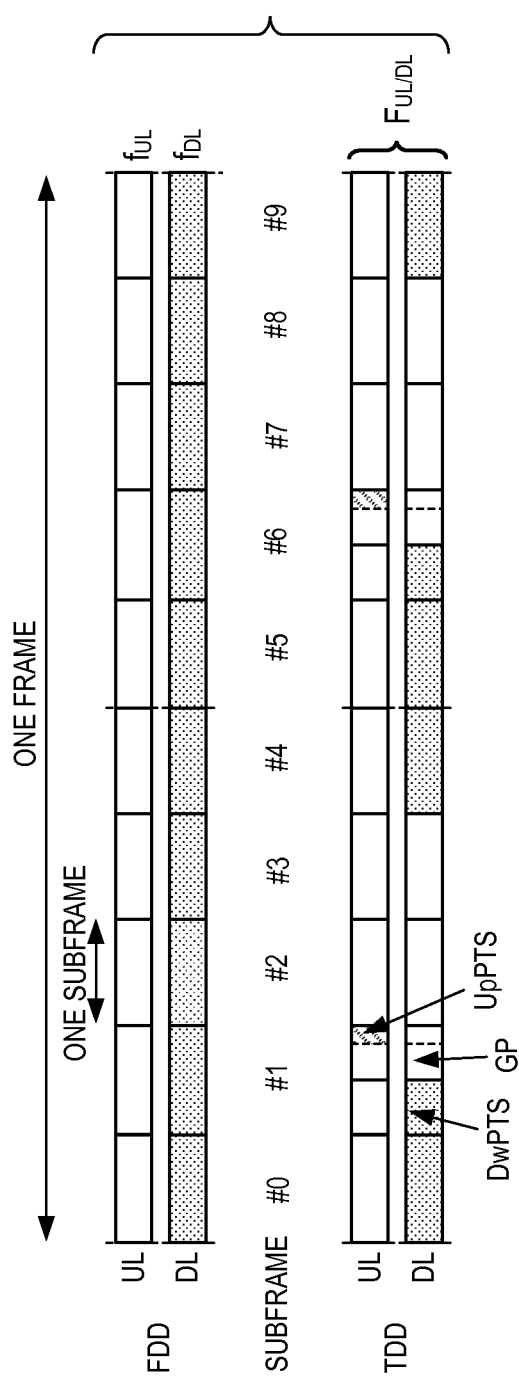
FIG. 2 illustrates uplink/downlink time/frequency structure for LTE, for the cases of frequency-division duplex (FDD) and time-division duplex (TDD).
Figure 3:
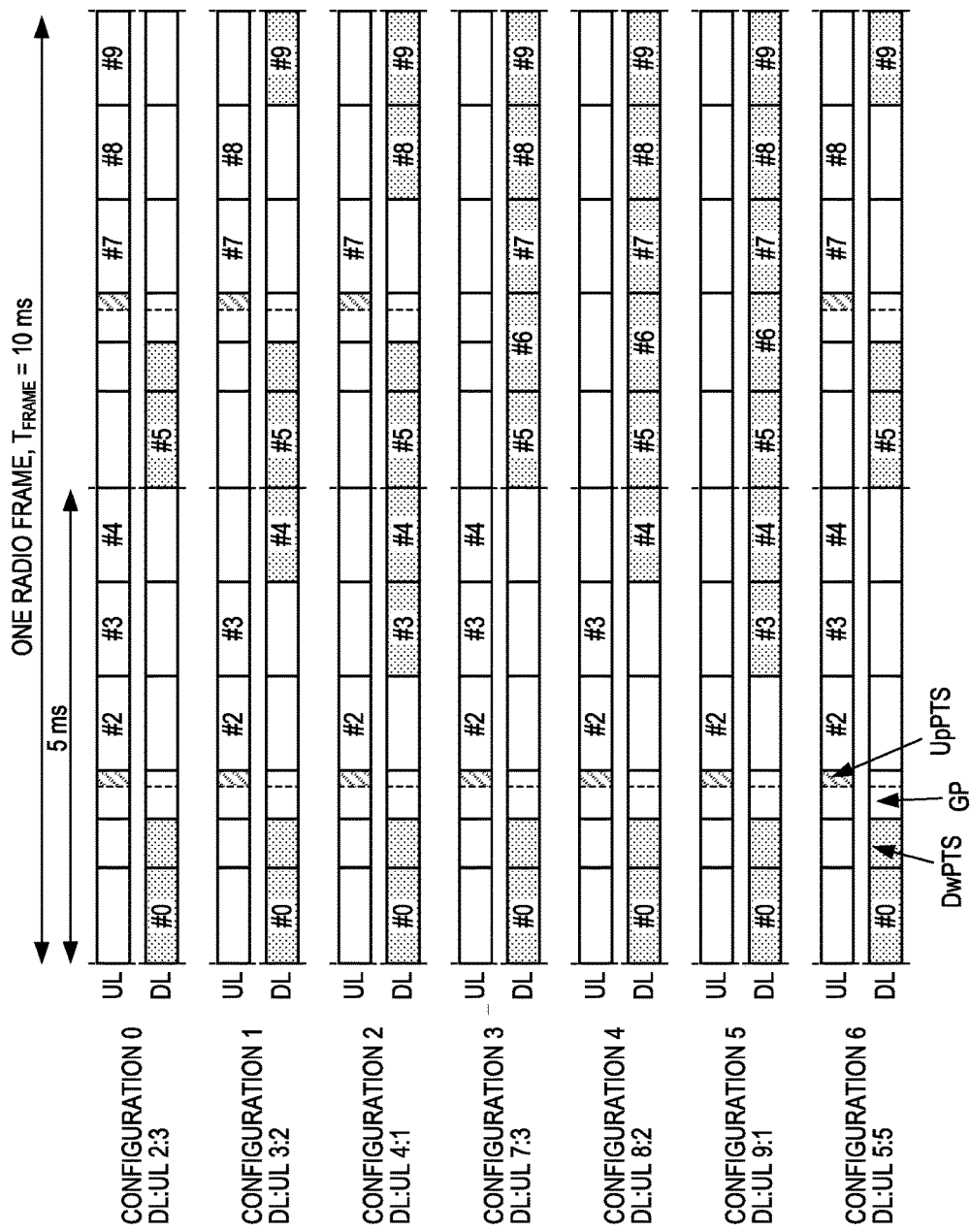
FIG. 3 is a diagram illustrating an example of seven different downlink/uplink configurations for time-division duplex (TDD) in Long Term Evolution (LTE).
Figure 4:
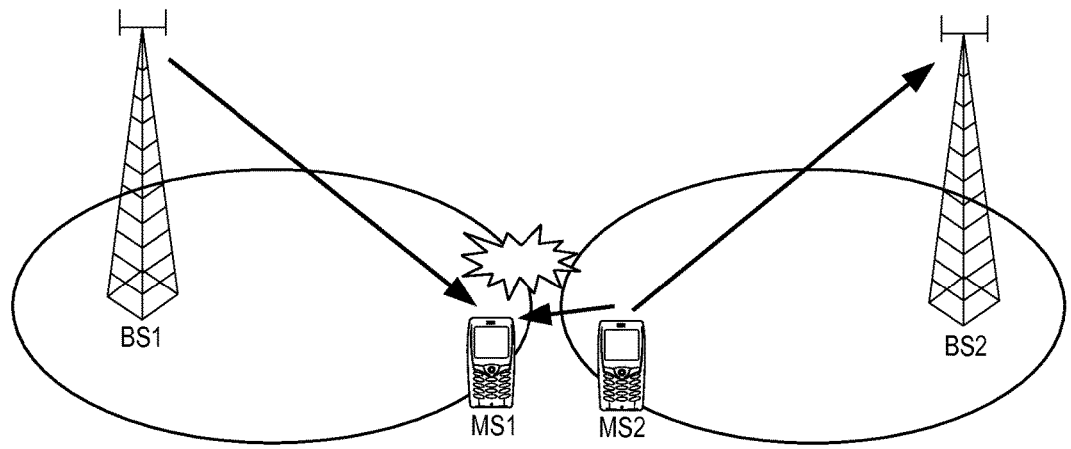
FIG. 4 illustrates an example of uplink/downlink (UL/DL) interference in time-division duplex (TDD).
Figure 5:
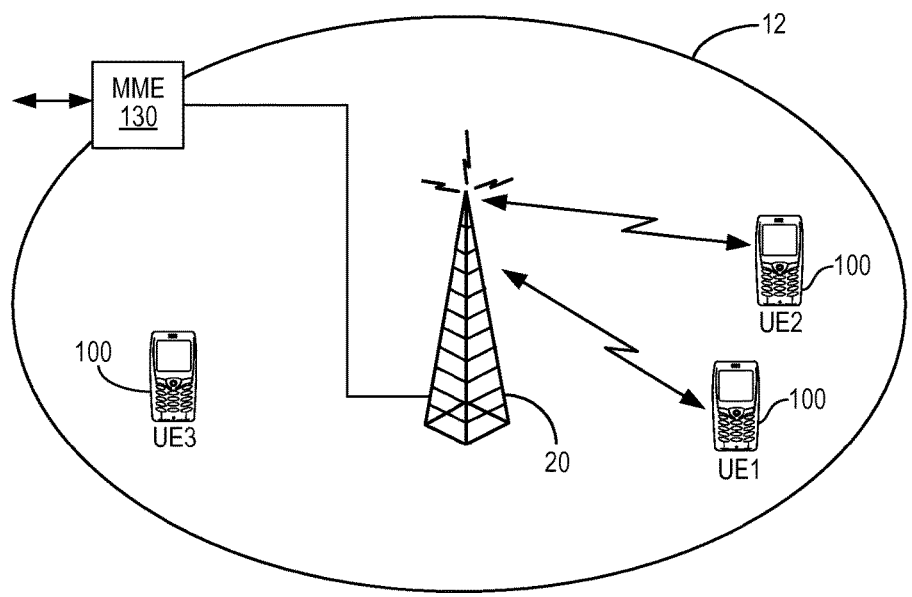
FIG. 5 illustrates a portion of an example LTE network, including multiple user equipments (UEs).

Referring now to the drawings, FIG. 5 illustrates an exemplary mobile communication network for providing wireless communication services to mobile terminals 100. Three mobile terminals 100, which are referred to as "user equipment" or "UE" in 3GPP terminology, are shown in FIG. 5. The mobile terminals 100 may comprise, for example, cellular telephones, personal digital assistants, smart phones, laptop computers, handheld computers, machine-type communication/machine-to-machine (MTC/M2M) devices or other devices with wireless communication capabilities. It should be noted that the term "mobile terminal," as used herein, refers to a terminal operating in a mobile communication network and does not necessarily imply that the terminal itself is mobile or moveable. Thus, the term as used herein should be understood to be interchangeable with the term "wireless device," and may refer to terminals that are installed in fixed configurations, such as in certain machine-to-machine applications, as well as to portable devices, devices installed in motor vehicles, etc.

The mobile communication network comprises a plurality of geographic cell areas or sectors 12. Each geographic cell area or sector 12 is served by a base station 20, which is referred to as an eNodeB in the context of an LTE radio access network, formally known as the Evolved Universal Terrestrial Radio Access Network, or E-UTRAN. One base station 20 may provide service in multiple geographic cell areas or sectors 12. The mobile terminals 100 receive signals from base station 20 on one or more downlink (DL) channels, and transmit signals to the base station 20 on one or more uplink (UL) channels.

In an LTE network, base station 20 is an eNodeB and may be connected to one or more other eNodeBs via an X2 interface (not shown). An eNodeB is also connected to an MME 130 via an S1-MME interface, and may be connected to one or more other network nodes, such as a Serving Gateway (not shown).

For illustrative purposes, several embodiments of the present invention will be described in the context of a EUTRAN system. Those skilled in the art will appreciate, however, that several embodiments of the present invention may be more generally applicable to other wireless communication systems.

As discussed above, in a TDD (Time Division Duplex) system, the same frequency is used both for downlink and uplink. Both the UE and the eNodeB must then switch between transmitting and receiving, assuming that full duplex operation is not possible. An illustration is given in FIG. 6 of the timing between downlink and uplink, which illustrates subframe transmit and receive times, at both the UE and the eNodeB, versus time, which can be measured in terms of an OFDM (or SC-FDMA) symbol index. Because of propagation delays, which may vary as the UE moves around in the coverage area of the eNodeB, downlink subframes transmitted by the eNodeB are received at the UE after a delay. A Fast-Fourier Transform, FFT, window in the UE receiver is aligned to the received subframes so that the data portion of the subframe falls completely within the FFT window, while the cyclic prefix, CP, portion of the subframe may overlap with the FFT window edge. Uplink subframes transmitted by the UE can only be transmitted after the complete of a UE switching time from receiving to transmitting modes, and are received at the eNodeB after a propagation delay. The timing of the UE transmissions is controlled by the eNodeB, so that the data-carrying portions of consecutive uplink subframes from multiple UEs do not overlap with one another and fall within the FFT window of the eNodeB receiver. Again, the portion of the subframe that includes a cyclic prefix, CP, may overlap with the edges of the eNodeB FFT window.

Figure 6:
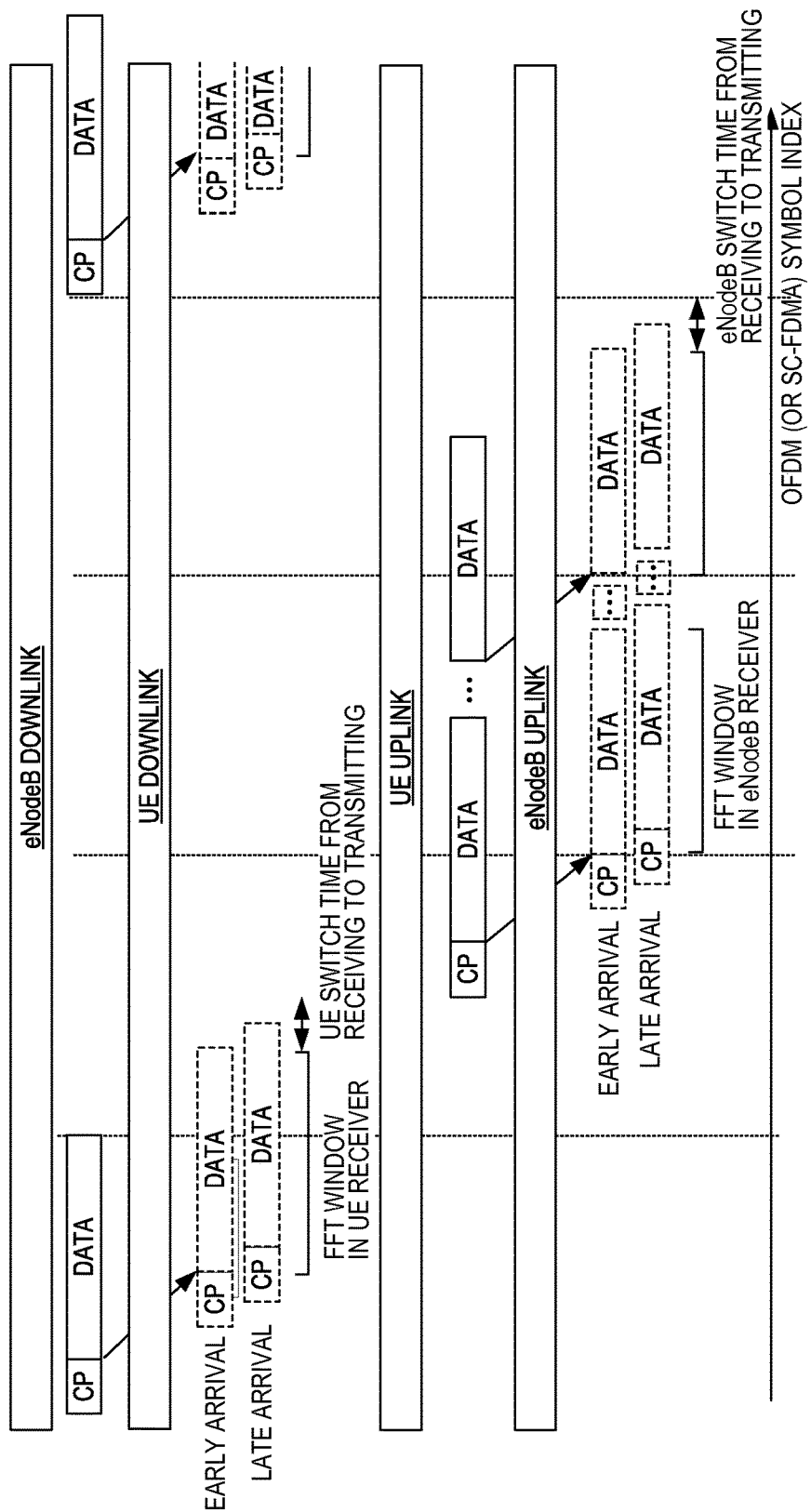
FIG. 6 illustrates downlink and uplink timing in a TDD system
Figures 7, 8:
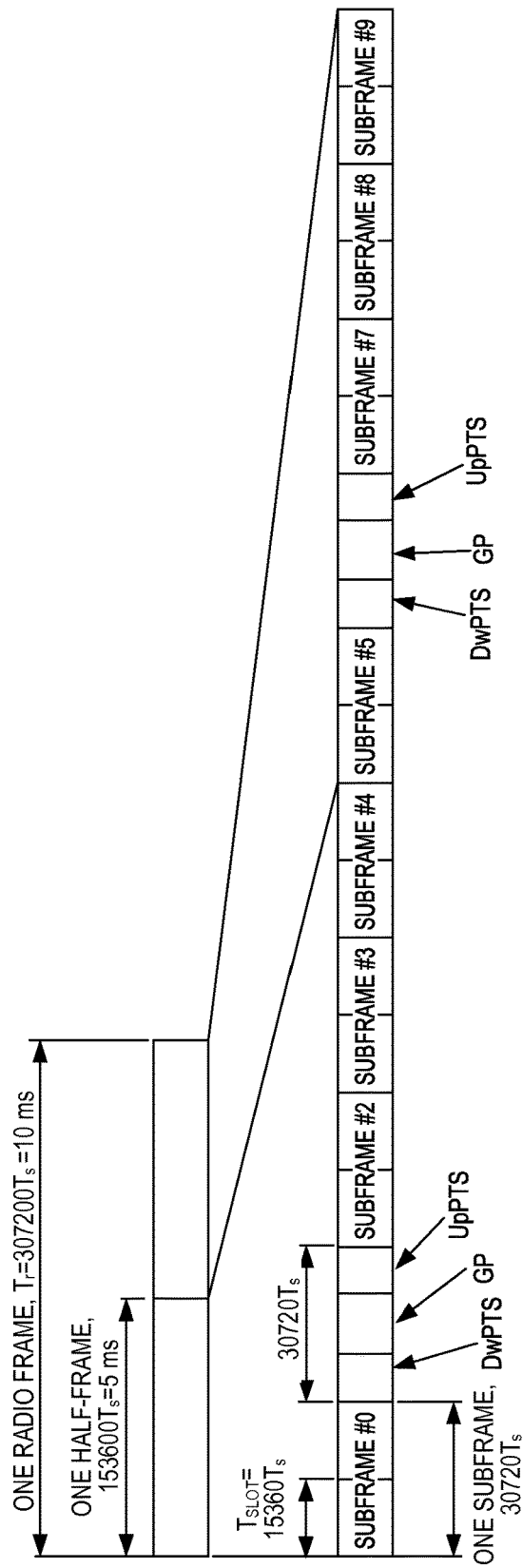
FIG. 7 shows uplink-downlink configurations according to 3GPP specifications.
FIG. 8 illustrates details of frame structure type 2 (for 5-millisecond switch-point periodicity), as specified by 3GPP.

A fixed allocation of uplink and downlink subframes is used in LTE release 11, and is defined in "Evolved Universal Terrestrial Radio Access (E-UTRA); Physical channels and modulation," 3GPP TS 36.211, V11.3.0, available at www.3gpp.org. A few predefined allocations are then specified as illustrated in FIG. 7, where uplink-downlink configurations 0-6 are illustrated, along with their respective periodicities of either 5-milliseconds or 10-milliseconds. In the chart shown in FIG. 7, each of subframe numbers 0-9 are indicated as either "D," "U,", or "S" subframes, corresponding to downlink, uplink, and special subframes, respectively. A special subframe is inserted between consecutive downlink and uplink subframes. The details of the special subframe are shown in FIG. 8. The special subframe contains OFDM and SC-FDMA symbols both for downlink and uplink respectively with a guard period in between. This guard period is used by the UE for transmitting with a timing advance, such that the uplink symbols are received within the FFT window of the eNodeB, as shown in FIG. 6. The guard period also provides time for the transmit and receive circuitry of eNodeB and UE to switch from downlink mode to uplink mode.

In a dynamic TDD system, the relation between the number of downlink subframes and uplink subframes is not fixed according to the semi-static configurations shown in FIG. 7, but can be flexibly configured depending of the current need. For example, a UE may treat every subframe as a downlink subframe unless it is explicitly instructed to transmit in a given subframe. This approach to dynamic TDD is described in U.S. Patent Application Publication 2011/0149813 A1, titled "Flexible Subframes" and published 23 Jun. 2011, the entire contents of which are incorporated herein by reference. When flexible subframes are used, the eNodeB sends a control signal to the UE indicating when and how it is scheduled to receive (i.e., a downlink assignment) and when and how to transmit in uplink (i.e. an uplink grant). In LTE, this control signaling can be carried by either the Physical Downlink Control Channel (PDCCH) or the Enhanced Physical Downlink Control Channel (EPDCCH). The downlink assignment is transmitted in the same subframe as the user data is transmitted while the uplink grant is transmitted a few subframes before the UE is scheduled to transmit in uplink.

A fixed relation between uplink and downlink results in an inflexible utilization of the radio resources. However, with dynamic TDD, the amount of control signaling might increase significantly if all UEs must be aware of which subframes that are used as downlink and uplink subframes respectively. Furthermore, in dynamic TDD a guard period is needed between consecutive downlink and uplink subframes, to allow the UE circuitry to switch from downlink to uplink mode.

A guard period can be created by omitting one or several OFDM symbols in downlink. In systems that utilize redundancy encoding, the receiving UE can treat those omitted OFDM symbols as "punctured" symbols, and reconstruct the data that would normally have been carried by those symbols using normal decoding techniques. Alternatively, the receiving UE can decode the data in the remaining portion of the subframe while working around the symbol intervals that carry no data. In either case, if the guard period is created by omitting one or several OFDM symbols in downlink then the eNodeB needs to send control messages to all UEs, indicating that the last OFDM symbols of a subframe are omitted. Thus, according to this approach a signaling is included in the downlink grant, the signaling indicating that the eNodeB is transmitting a subframe that is one or several OFDM (or SC-FDMA) symbols shorter than a normal subframe and where the transmission of this subframe ends one or several OFDM (or SC-FDMA) symbol intervals earlier than it would with a normal subframe. Note that this indication needs to be signaled to all UEs that are scheduled for this subframe, and thus can require a large signaling overhead.

An alternative is that the UEs can blindly detect whether one or several of the last OFDM symbols have been omitted. However, if the UEs are not well mutually isolated then another UE might transmit in uplink during these last downlink OFDM symbols, causing interference. This interference can result in unreliable detection of the omission of OFDM symbols, causing performance degradations.

Figure 9:
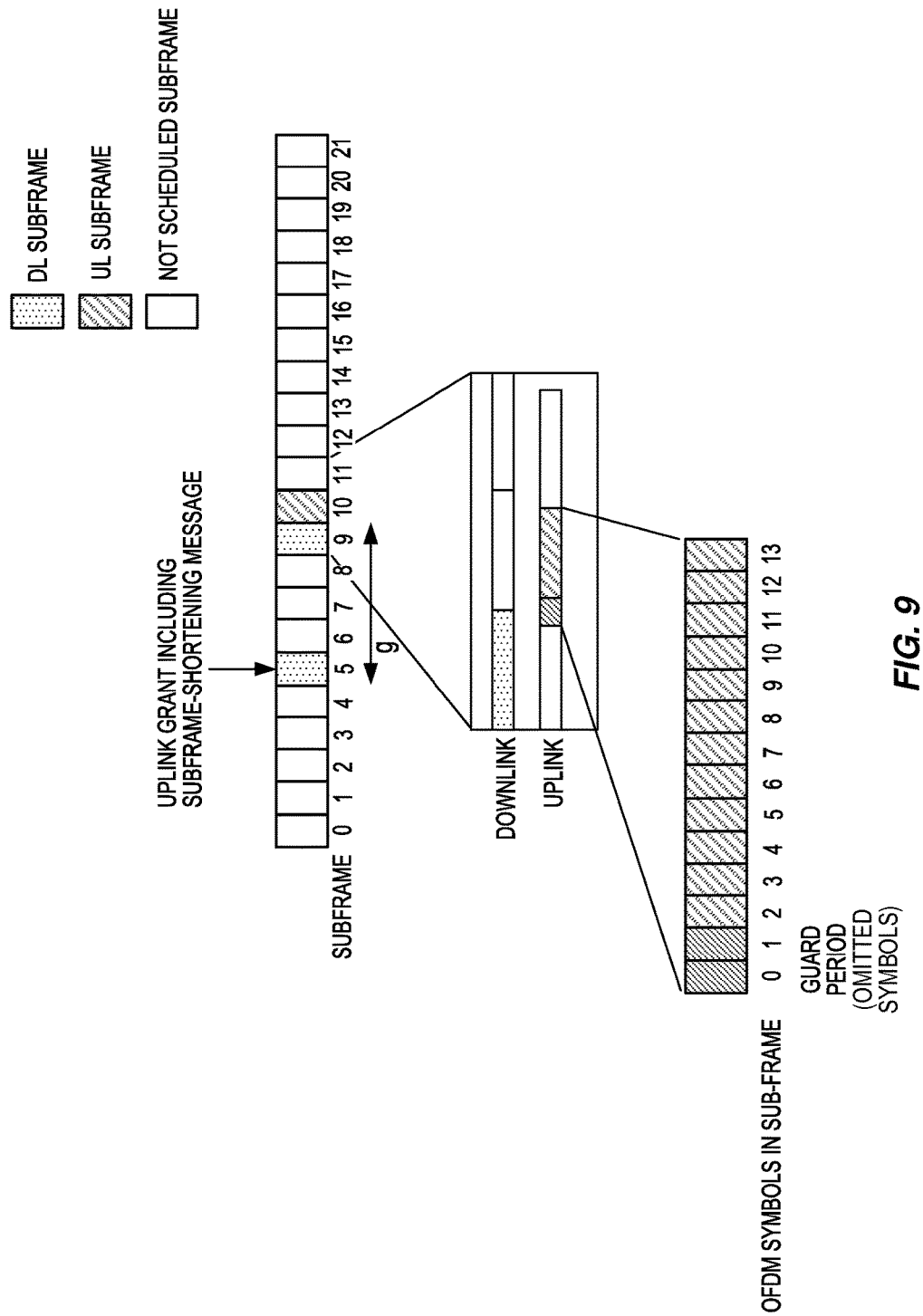
FIG. 9 illustrates shortening of uplink OFDM symbols after a downlink subframe.

Another approach is for the UE to create the guard period by omitting one or more symbols from the beginning of an uplink subframe transmission. According to this approach, the base station includes signaling in the UL grant that indicates the UE should transmit a subframe that is one or several OFDM (or SC-FDMA symbols) shorter than a normal subframe and where the transmission of this subframe starts one of several OFDM (or SC-FDMA) symbol intervals later than a normal subframe The subframe timing according to this latter approach is illustrated in FIG. 9, where a series of subframes are flexibly scheduled, with one subframe scheduled for uplink, UL, use, two others scheduled for downlink, DL, use, and the remaining subframes being unscheduled. The uplink grant is transmitted in downlink in subframe n (n=5 in FIG. 9), and indicates that the UE is to transmit in uplink in subframe n+g (g=5 in FIG. 9). If eNodeB transmits in the downlink in subframe n+g−1 (subframe 9), then the UE must omit one or several OFDM (or SC-FDMA) symbols from the beginning of its transmission of uplink subframe n+g (subframe 10 in FIG. 9), to create a short guard period. A "subframe-shortening message" is thus included in the uplink grant, indicating to the UE that it needs to omit one or more symbols from the beginning of the uplink subframe transmission. As shown at the bottom of FIG. 9, the uplink subframe spans a subframe interval that includes 14 symbol intervals numbered 0-13. Each of these symbol intervals normally carries an OFDM (or SC-FDMA) symbol. However, the OFDM symbol can be omitted from one or more symbol intervals at the beginning of the subframe interval. In the example illustrated in FIG. 9, a guard period is created by omitting two OFDM symbols at the beginning of the subframe interval.

Figure 10:
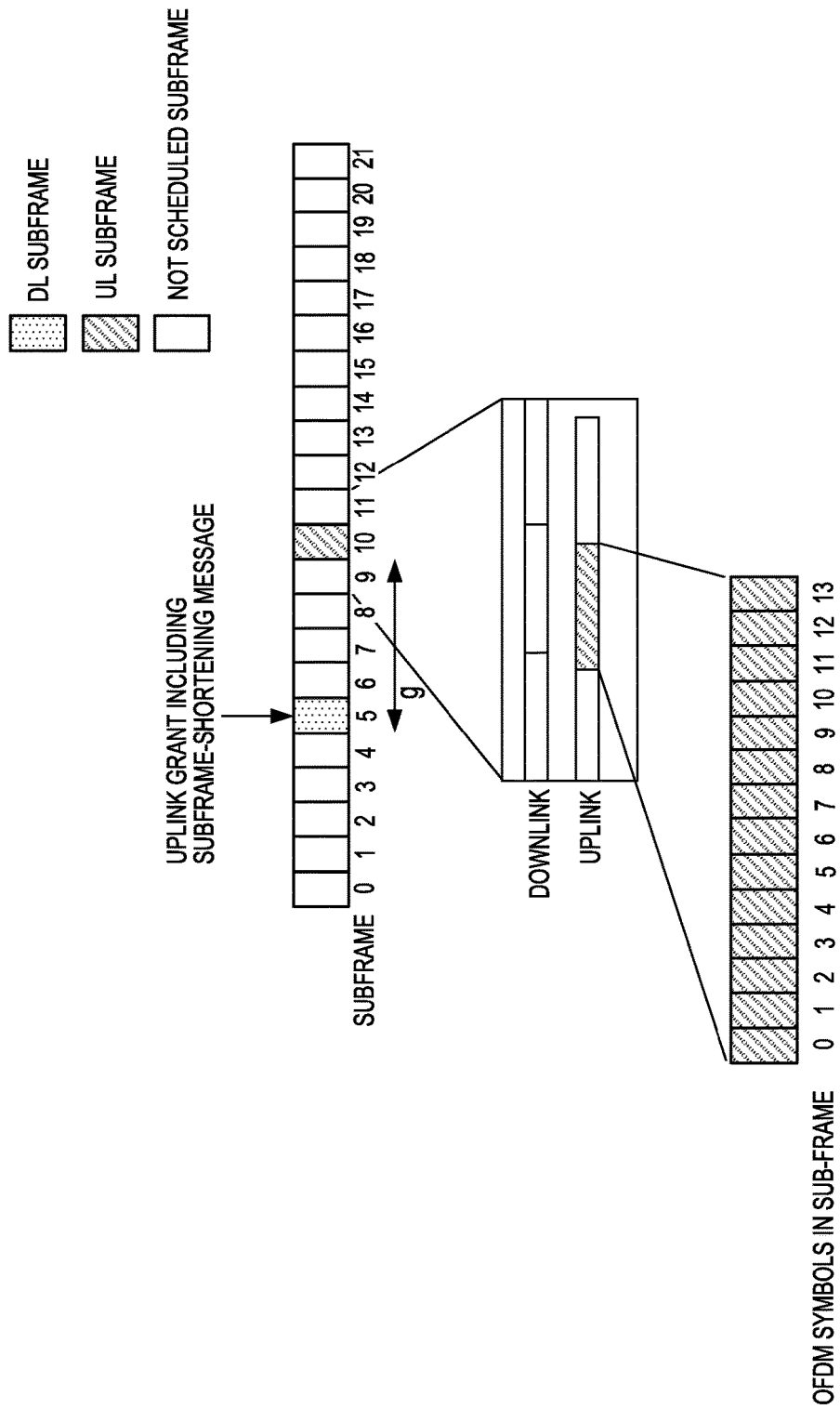
FIG. 10 illustrates no omitting of uplink OFDM symbols, when the uplink subframe is not preceded by a downlink subframe.
Figure 11:
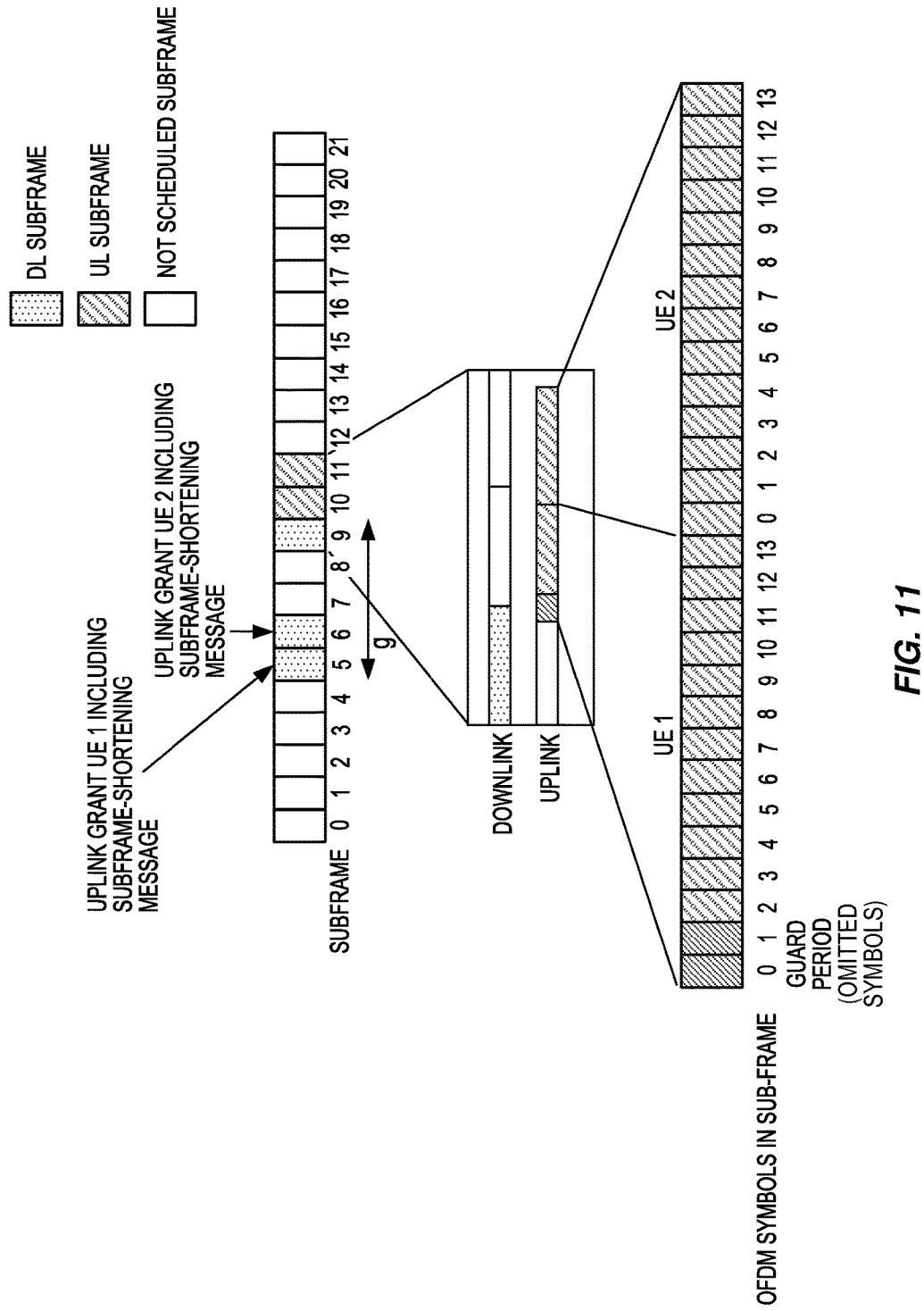
FIG. 11 illustrates no omitting of uplink OFDM symbols for UE 2 after an uplink subframe.

Note that if subframe n+g−1 (subframe 9) does not contain any downlink transmissions from the eNodeB, as shown in FIG. 10, or if subframe n+g−1 is an uplink subframe from another UE, as shown in FIG. 11, then the UE does not have to omit one or more symbols from the beginning of the uplink subframe in subframe n+g. FIG. 10 is thus similar to FIG. 9, except that no downlink subframe is scheduled for the subframe interval preceding the scheduled uplink subframe, which means that the UE does not need to create a guard period by omitting symbols from the beginning of the uplink subframe. FIG. 11 is also similar to FIG. 9, except that two consecutive uplink subframes are scheduled, one for each of two UEs, immediately following a downlink subframe. Because the uplink subframe scheduled for UE2 follows an uplink subframe scheduled for UE1, not a downlink subframe, there is no need for UE2, to create a guard period in the second uplink subframe. Thus, as shown at the bottom of FIG. 11, only the first of the two uplink subframes includes a guard period created by omitting symbols at the beginning of the subframe interval. These cases (i.e., the scenarios shown in FIGS. 10 and 11) are also controlled by the uplink grant, i.e., by omitting a subframe-shortening message entirely or by including a subframe-shortening message indicating that no shortening is needed for a given uplink subframe. Note that when the eNodeB sends the uplink grant in subframe n, it may not be certain that subframe n+g−1 will be used for a downlink transmission. Generally, if the eNodeB knows that the subframe n+g−1 will not be used for downlink transmissions, then it should send a subframe-shortening message indicating that no message is needed, or omit the subframe-shortening message from the uplink grant, depending on the implementation of the messaging schemed. If the eNodeB does not yet know whether or not there is to be a downlink transmission in subframe n+g−1, then it should assume that there will be, and send an appropriate subframe-shortening message.

In some embodiments, the subframe-shortening message within the uplink grant only includes a single bit, which signals whether or not to omit the first OFDM (or SC-FDMA) symbols of the uplink transmission. In these embodiments, the UE may be pre-configured, either by hard programming or semi-statically, e.g., by RCC signaling, with a predetermined number of symbols to omit in the event that a subframe-shortening message is received. A somewhat more flexible format can also be used in which the subframe-shortening message explicitly indicates the number of OFDM (or SC-FDMA) symbols to be omitted. With this approach, only one OFDM (or SC-FDMA) symbol needs to be omitted if the round trip time is small, while UEs with large round trip time might need to omit multiple OFDM symbols. In some embodiments, an eNodeB may be configured to always use the same indication, based on the cell size. In other embodiments, the roundtrip time for each UE is estimated and continuously tracked in the eNodeB, such that the subframe-shortening message can be adapted towards the round trip time for each individual UE.

For example, assume that two bits are used for the subframe-shortening message. In this example, the bit sequence "00" may be used to signal that no omitting of uplink OFDM (or SC-FDMA) symbols should be done. Sequence "01" can be used to indicate that one OFDM (or SC-FDMA) symbols should be omitted, sequence "10" indicate two OFDM (or SC-FDMA) symbols should be omitted, while sequence "11" would indicate the omitting of three OFDM (or SC-FDMA) symbols. Alternatively, the numbers of OFDM symbols to be punctured as indicated by the bit(s) of the subframe-shortening message can be semi-statically configured by higher layers.

Figure 12:
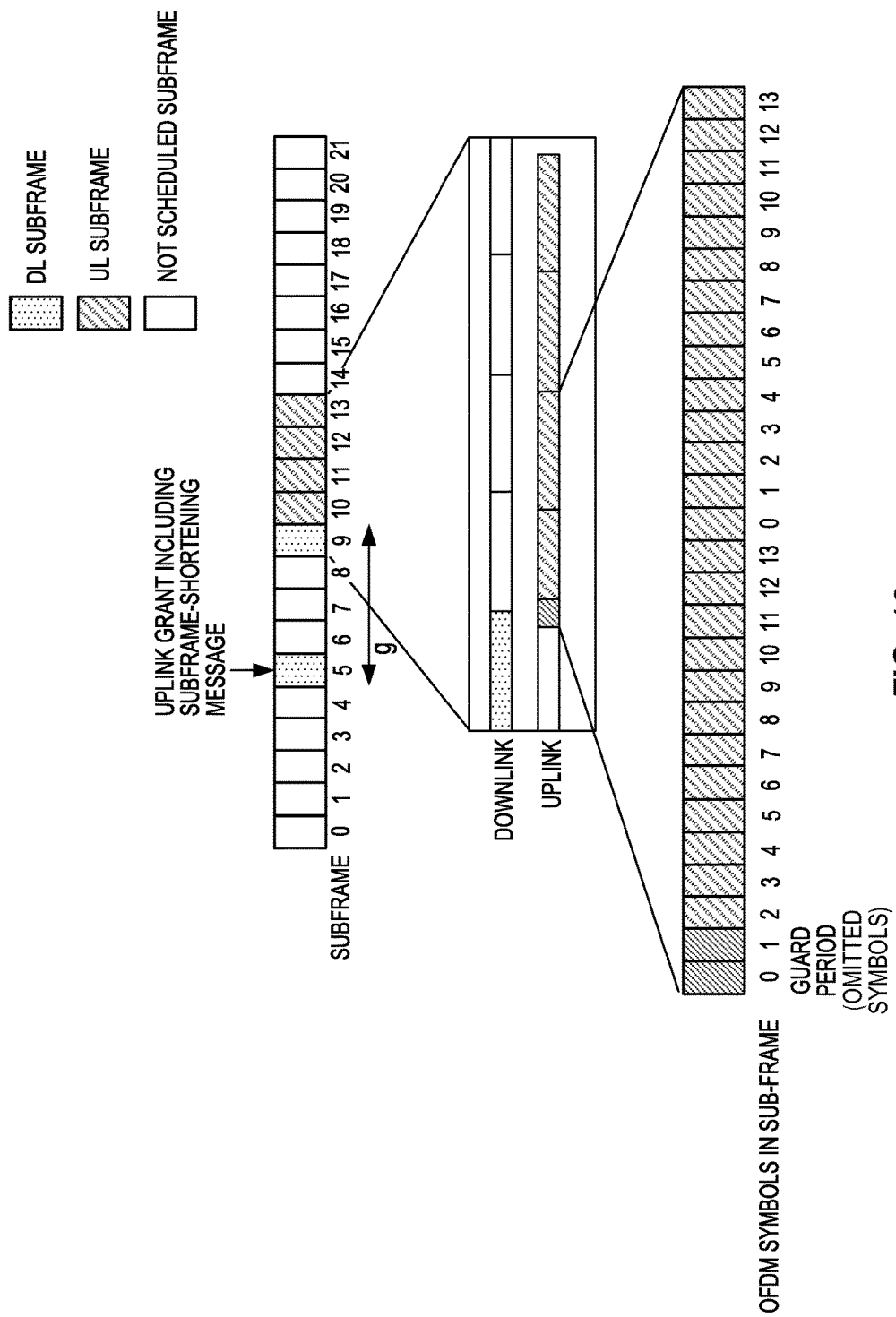
FIG. 12 illustrates omitting of uplink OFDM symbols in the first subframe of an uplink grant for several subframes.

It will be appreciated that an uplink grant can contain a grant for several subframes. If these uplink subframes are consecutive, then signaling about subframe shortening is only needed for the first of the simultaneously scheduled subframes. This is shown in FIG. 12, which illustrates a scenario in which the uplink grant schedules the UE for three consecutive uplink subframes following a downlink subframe. As shown at the bottom of the figure, only the first uplink subframe includes a guard period created by omitting one or more symbols from the beginning of the subframe.

Figure 13:
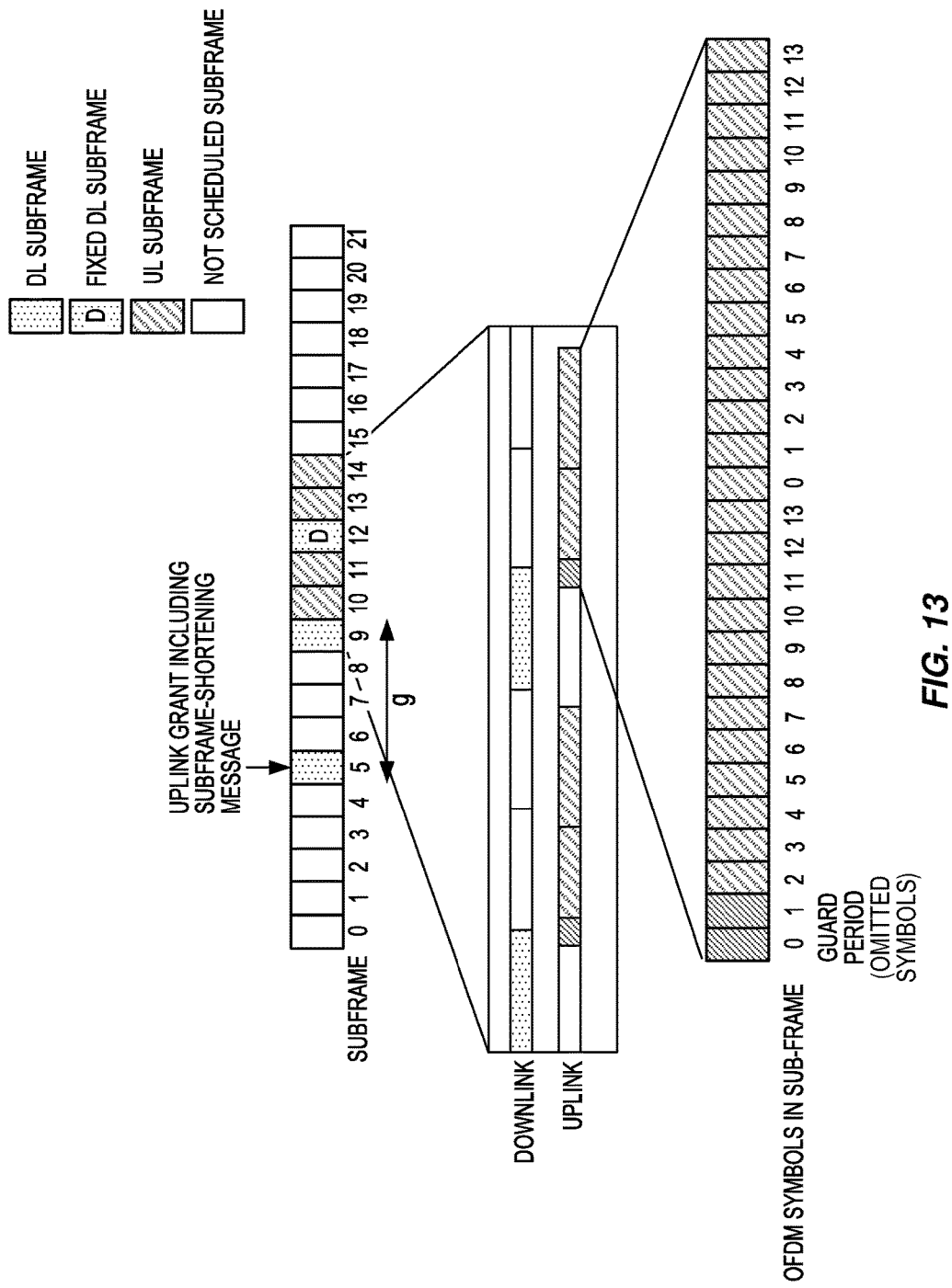
FIG. 13 illustrates the omitting of uplink OFDM symbols after a fixed downlink subframe.

In addition, a dynamic TDD system might be configured with a few subframes that are fixed for downlink and thus are never used for uplink. These subframes might be needed, for example, for synchronization and broadcast control messages used for continuous synchronization and initial synchronization and call setup. One or more of these fixed downlink subframes can occur inside a UE's multi-subframe uplink grant. In this case, the UE cannot transmit during the fixed downlink subframe, but can continue afterwards. Here, the UE can either continue to transmit all the remaining subframes according to its uplink grant, or consider one of the subframes in the grant to be "punctured" by the fixed downlink subframe, such that the total uplink transmission effectively contains one less subframe than indicated by the uplink grant. In either case, the UE must omit one or several OFDM (or SC-FDMA) symbols of the first subframe after this fixed downlink subframe, as shown in FIG. 13, in which the fixed downlink subframe is indicated by a "D". As in the preceding figures, the uplink grant is transmitted in downlink in subframe n (n=5 in FIG. 13), and indicates that the UE is to transmit in uplink beginning in subframe n+g (g=5 in FIG. 13). In this case, the multi-subframe grant overlaps the fixed downlink subframe in subframe 12, which means that the uplink subframe transmitted after this downlink subframe must be shortened. A need for this subframe shortening does not have to be signaled to the UE, however, since the UE is already aware of this fixed downlink subframe. If a flexible shortening of the subframe is used, then a default amount of omitted OFDM (or SC-FDMA) symbols can be used. Alternatively, a subframe shortening according to the last received subframe-shortening message within an uplink grant to the specific UE may be used. In either case, the UE creates a guard period at the beginning of the first uplink subframe following the fixed downlink subframe, as shown at the bottom of FIG. 13.

An eNodeB might use beam-forming, in either or both of the downlink and uplink, to increase the signal-to-interference-plus-noise ratio (SINR) for a UE. This beam-forming can be done in baseband, in which case a change between different beam-formers can be done on a sample-to-sample basis. However, for other types of beam-forming techniques, such as analog beamforming realized with microwave or RF phase adjusters, a guard might be needed for the components to apply this change of beam-forming. Also, a guard period can be used to halt transmission in uplink during a calibration phase. In these cases, the eNodeB can instruct the UE to omit one or several of the first OFDM (or SC-FDMA) symbols in a given uplink subframe, for this purpose.

Figure 14C:
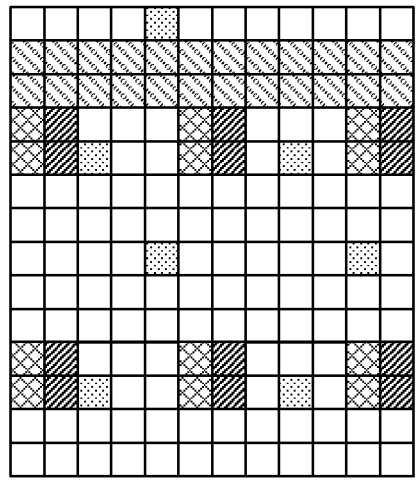
FIG. 14C shows a subframe with two OFDM symbols omitted and time-shifted DM-RS, CSI-RS, eSS.
Figure 14B:
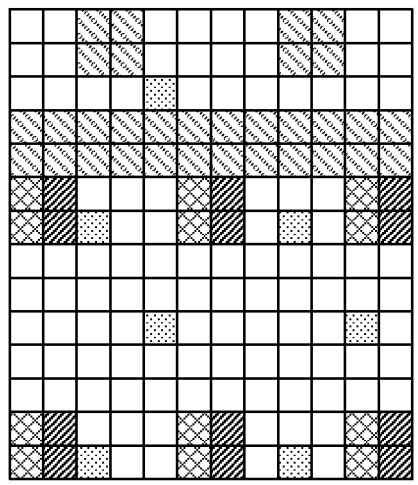
FIG. 14B illustrates a subframe with time shifted DM-RS, CSI-RS, eSS.
Figure 14A:
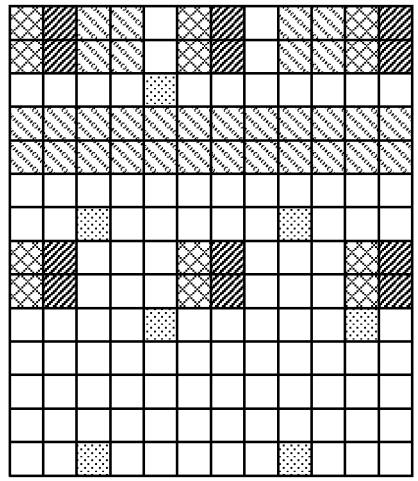
FIG. 14A shows a subframe with DM-RS, CSI-RS, eSS.

FIG. 14A illustrates an example resource block (a time-frequency resource consisting of twelve consecutive OFDM subcarriers in a subframe interval) of a subframe. In the figure, the multiple subcarriers are shown in the vertical dimension, while the subframe intervals extend in the horizontal dimension. In the illustrated example, the subframe consists of 14 OFDM symbols and includes several reference signals, including demodulation reference signals (DM-RS), channel-state-information reference symbols (CSI-RS), and Cell specific Reference Signals (CRS). For more details of these signals, see the 3GPP document "Evolved Universal Terrestrial Radio Access (E-UTRA); Physical channels and modulation," 3GPP TS 36.211, V11.3.0, available at www.3gpp.org. A similar mapping can be used in future wireless standards.

An example of an alternative mapping is given in FIG. 14B in which the mapping of reference symbols is changed in order to facilitate start of the channel estimation before all OFDM symbols of a subframe are received. However, when omitting the first OFDM symbols of a subframe, then the reference symbols should not be omitted. In those subframes when one or several OFDM symbols are omitted, alternative mappings of reference symbols and user-data modulated symbols can be considered, for example as in FIG. 14C.

Figure 15B:
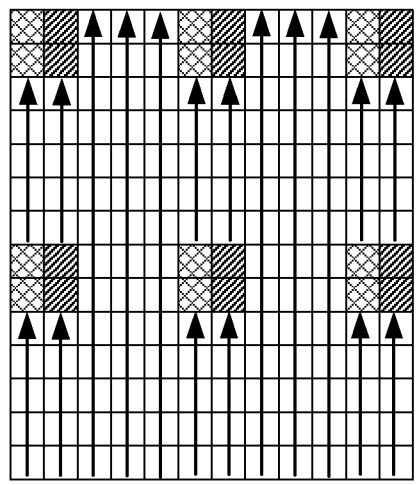
FIG. 15B shows a subframe with mapping in time first, followed by frequency.
Figure 15A:
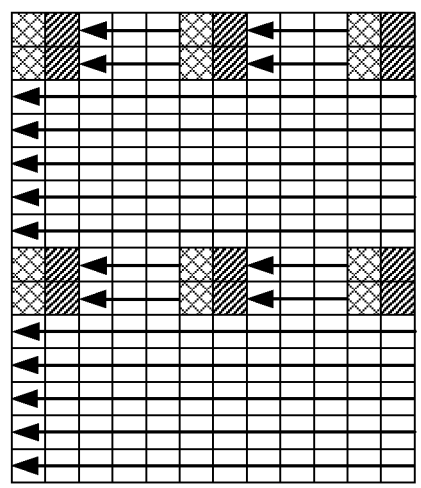
FIG. 15A illustrates a subframe mapped according to frequency first, followed by time.

In any of the embodiments described above, the uplink subframe might be shortened by simply not transmitting the first one or two symbols of a subframe. Omitting more symbols can also be considered if the system is designed for environments with large distances between eNodeB and the UE, i.e. where large round trip times are anticipated. However, in LTE release 11 the channel coding is designed such that parts of the user data cannot be decoded in some cases if the first symbol is omitted. To be more specific, the user data is segmented into several code blocks, as specified in "Evolved Universal Terrestrial Radio Access (E-UTRA); Multiplexing and channel coding," 3GPP TS 36.212, V11.3.0, available at www.3gpp.org. Each such code block is turbo coded and interleaved independently, and the code words are then concatenated, modulated and mapped to OFDM (or SC-FDMA) symbols. Within this mapping, the sequence of concatenated modulated symbols is first mapped to the subframe in frequency, i.e., across subcarriers, and then in time, as shown in FIG. 15A. FIGS. 15A and 15B each illustrate an example resource block consisting of twelve consecutive OFDM subcarriers in a subframe interval. In the figures, the multiple subcarriers are shown in the vertical dimension, while the subframe intervals extend in the horizontal dimension. In the illustrated example, the subframe consists of 14 OFDM symbols and includes several reference signals, including demodulation reference signals (DM-RS). Other reference symbols have been omitted for clarity. In 15A, a sequence of modulated symbols is first mapped vertically, i.e., across frequency, as indicated by the arrows, and then horizontally, i.e., across time. A consequence of this mapping is that one or several code words can be completely punctured when puncturing one or several whole OFDM (or SC-FDMA) symbols. One solution to this problem is to change the way the sequence of concatenated modulated symbols are mapped to OFDM and SC-FDMA symbols. One approach is shown in FIG. 15B, where the mapping is done in time first, as indicated by the horizontal arrows. However, one drawback with mapping in time first is the reduced frequency diversity. This can be mitigated if the mapping is done by alternating between mapping in time and frequency.

Figure 16:
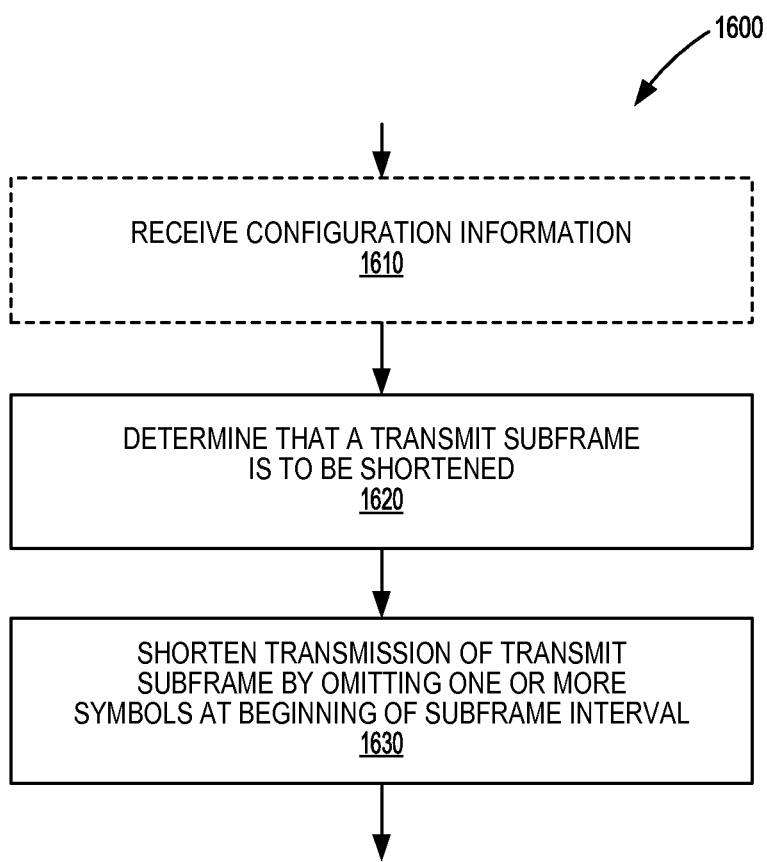
FIG. 16 is a process flow diagram illustrating an example method according to the presently disclosed techniques.

Above, various techniques for transmitting and receiving shortened subframes have been described in the context of an LTE system. It should be understood, however, that these techniques are more generally applicable to TDD wireless links between wireless nodes, and do not depend on the wireless nodes having the UE-to-base-station relationship found in an LTE system. FIG. 16 thus illustrates a method suitable for implementation in a first wireless node that is configured to transmit data in transmit subframes occurring at defined subframe intervals and having a predetermined length, e.g., a predetermined number of symbol intervals. If this method is implemented in the LTE context, then the first wireless node may be a UE, in communication with an eNodeB.

As shown at block 1610, the illustrated method may begin with receiving configuration information from a second wireless node, the configuration information specifying a predetermined number of symbols to be omitted from uplink subframes in the event that a shortened subframe is to be transmitted. In FIG. 16, this operation is illustrated with a dashed outline, indicating that this operation is not present in every embodiment or in every instance of the illustrated method.

As shown at block 1620, the illustrated method includes determining that a transmit subframe is to be shortened, relative to the predetermined length. This may be done in some embodiments or in some instances by receiving a grant message containing subframe-shortening information. In other embodiments or in other instances, however, the first wireless node may determine that the transmit subframe is to be shortened by determining that a scheduled broadcast subframe is to be received in a receive subframe preceding and overlapping the transmit subframe.

As shown in block 1630, the illustrated method further includes shortening transmission of the transmit subframe. This is done by not transmitting during a beginning portion of the subframe interval for the transmit subframe and transmitting during the remainder of the subframe interval. In some embodiments, the predetermined duration of the subframe is a predetermined number of symbol intervals, in which case shortening transmission of the subframe comprises not transmitting during one or more symbol intervals at the beginning of the transmit subframe. Note that as the terms are used here, a subframe interval consists of a particular number (e.g., 14) of symbol intervals, each of which normally carries a transmitted symbol. When the subframe is shortened, one or more of the subframe intervals does not carry a transmitted symbol.

As noted above, determining that the first transmit subframe is to be shortened may comprise receiving, from a second wireless node, a grant message containing subframe-shortening information, the subframe-shortening information indicating that the transmit subframe is to be shortened. In some embodiments, the subframe-shortening information consists of a single bit indicating that the transmit subframe is to be shortened by omitting a predetermined number of symbols from the beginning of the transmit subframe. In some of these embodiments, the first wireless node receives configuration information from the second wireless node, as shown at block 1610, prior to receiving the grant message, the configuration information specifying the predetermined number. In other embodiments, the subframe-shortening information received from the second wireless node specifies a number of symbols to be omitted at the beginning of the transmit subframe.

Figure 17:
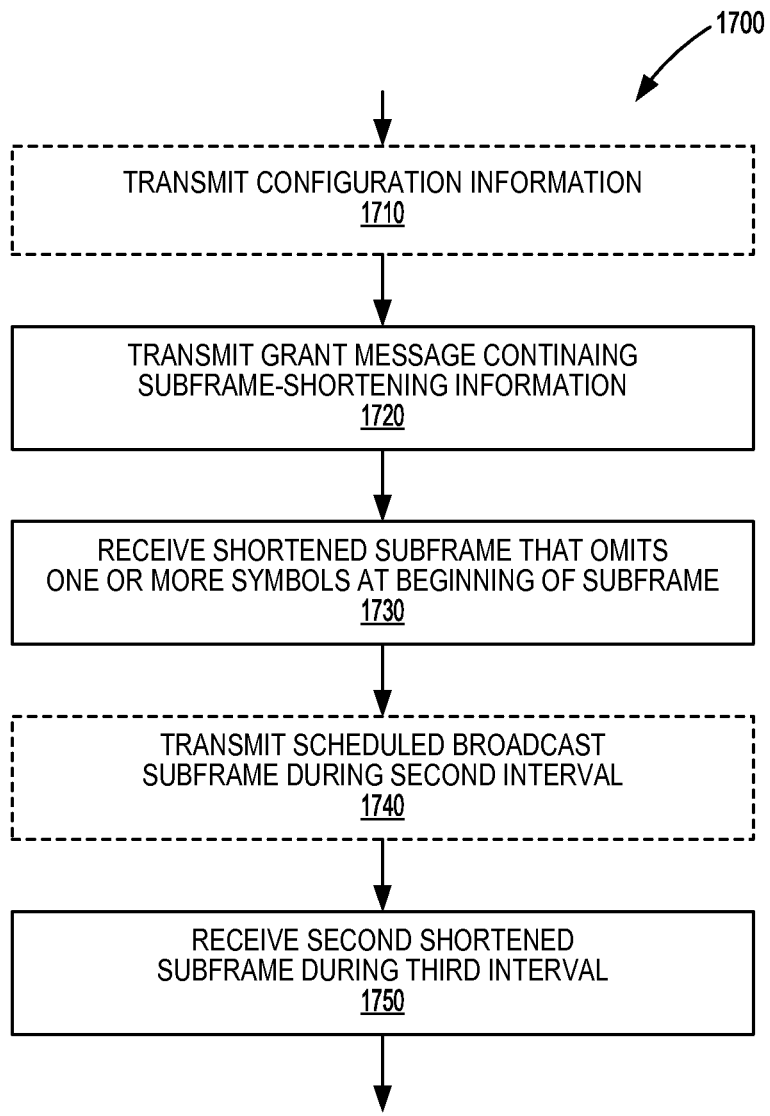
FIG. 17 is a process flow diagram illustrating another example method.

FIG. 17 illustrates a method implemented at the other end of the link from the wireless node corresponding to FIG. 16. Thus, the method illustrated in FIG. 17 is suitable for implementation in a wireless node configured to receive data in receive subframes occurring at defined subframe intervals and having a predetermined length, e.g., a predetermined number of symbol intervals. In an LTE context, this node may be the eNodeB.

As shown at block 1710, the illustrated method may begin with transmitting configuration information to a second wireless node, the configuration information specifying a predetermined number of symbols to be omitted from uplink subframes in the event that a shortened subframe is to be transmitted. In FIG. 17, this operation is illustrated with a dashed outline, indicating that this operation is not present in every embodiment or in every instance of the illustrated method.

As shown at block 1720, the illustrated method continues with transmitting, to the second wireless node, a grant message containing subframe-shortening information, the subframe-shortening information indicating that a subframe transmitted by the second wireless node during a first subframe interval is to be shortened. In an LTE context, this second wireless node is a UE, for example. As shown at block 1730, the method continues with receiving a first shortened subframe from the second wireless node, during the first subframe interval, wherein the first shortened subframe is shortened, relative to the predetermined length.

In some embodiments, the subframe-shortening information sent to the second wireless node specifies a number of symbols to be omitted at the beginning of the subframe transmitted during the first subframe interval. In other embodiments, the subframe-shortening information instead consists of a single bit indicating that the subframe transmitted during the first subframe interval is to be shortened by omitting a predetermined number of symbols from the beginning of the transmitted subframe. In some of these embodiments, the wireless node transmits configuration information, to the second wireless node, prior to transmitting the grant message, the configuration information specifying a number of symbols to be omitted from the beginning of the subframe transmitted during the first subframe interval.

In some embodiments, the wireless node decodes data from the first shortened subframe, by treating one or more omitted symbols at the beginning of the first subframe interval as punctured data. In other embodiments, the wireless node retrieves decoded data from the first shortened subframe by de-mapping data symbols from the first downlink subframe according to a de-mapping pattern that disregards omitted symbol intervals at the beginning of the first subframe interval and decoding the de-mapped data symbols.

In some embodiments, the wireless node may further transmit a scheduled broadcast subframe during a second subframe interval, and receive a second shortened subframe during a third subframe interval immediately succeeding the second subframe interval. This is shown at blocks 1740 and 1750, which are shown with a dashed outline to indicate that these operations are "optional" in the sense that they may not appear in every embodiment or in every instance of the illustrated embodiment.

Figure 18:
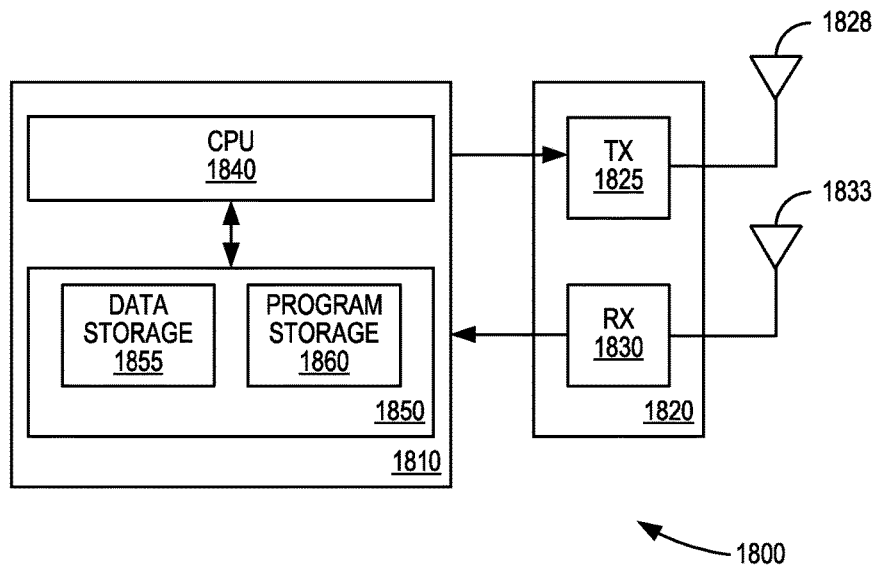
FIG. 18 is a block diagram showing components of an example user equipment.

Several of the methods described above and illustrated generally in FIGS. 16 and 17 may be implemented using radio circuitry and electronic data processing circuitry provided in a mobile terminal. FIG. 18 illustrates features of an example wireless node 1800 according to several embodiments of the present invention, in this case embodied as a mobile terminal. Mobile terminal 1800, which may be a UE configured for operation in an LTE system, comprises a transceiver 1820 for communicating with one or more base stations as well as a processing circuit 1810 for processing the signals transmitted and received by the transceiver 1820. Transceiver 1820 includes a transmitter 1825 coupled to one or more transmit antennas 1828 and receiver 1830 coupled to one or more receiver antennas 1833. The same antenna(s) 1828 and 1833 may be used for both transmission and reception. Receiver 1830 and transmitter 1825 use known radio processing and signal processing components and techniques, typically according to a particular telecommunications standard such as the 3GPP standards for LTE. Because the various details and engineering tradeoffs associated with the design and implementation of such circuitry are well known and are unnecessary to a full understanding of the invention, additional details are not shown here.

Processing circuit 1810 comprises one or more processors 1840 coupled to one or more memory devices 1850 that make up a data storage memory 1855 and a program storage memory 1860. Processor 1840, identified as CPU 1840 in FIG. 18, may be a microprocessor, microcontroller, or digital signal processor, in some embodiments. More generally, processing circuit 1810 may comprise a processor/ firmware combination, or specialized digital hardware, or a combination thereof. Memory 1850 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices are well known and are unnecessary to a full understanding of the invention, additional details are not shown here.

Typical functions of the processing circuit 1810 include modulation and coding of transmitted signals and the demodulation and decoding of received signals. In several embodiments, processing circuit 1810 is adapted, using suitable program code stored in program storage memory 1860, for example, to carry out one of the techniques described for transmitting shortened subframes.

Accordingly, in various embodiments of the invention, processing circuits are configured to carry out one or more of the techniques described in detail above. Likewise, other embodiments include mobile terminals (e.g., LTE UEs) including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

The mobile terminal 1800 of FIG. 18 may also be understood as an example of a wireless device configured for operation in a wireless communication network and comprising several functional modules, each of which may be implemented using analog and/or digital hardware, or a processing circuit configured with appropriate software and/or firmware, or a combination thereof. For example, in some embodiments a mobile terminal comprises a transceiver circuit that includes a transmitter circuit for transmitting data in transmit subframes occurring at defined subframe intervals and having a predetermined number of symbol intervals, as well as a determining circuit for determining that a transmit subframe is to be shortened, relative to the predetermined number of symbols, and a subframe-shortening circuit, responsive to the determining circuit, for shortening transmission of the transmit subframe by not transmitting during one or more symbol times at the beginning of the subframe interval for the transmit subframe and transmitting during the remainder of the subframe interval. It will be appreciated that the several variations described above in connection with the method illustrated in FIG. 16 are equally applicable to the mobile terminal implementations described here.

Figure 19:
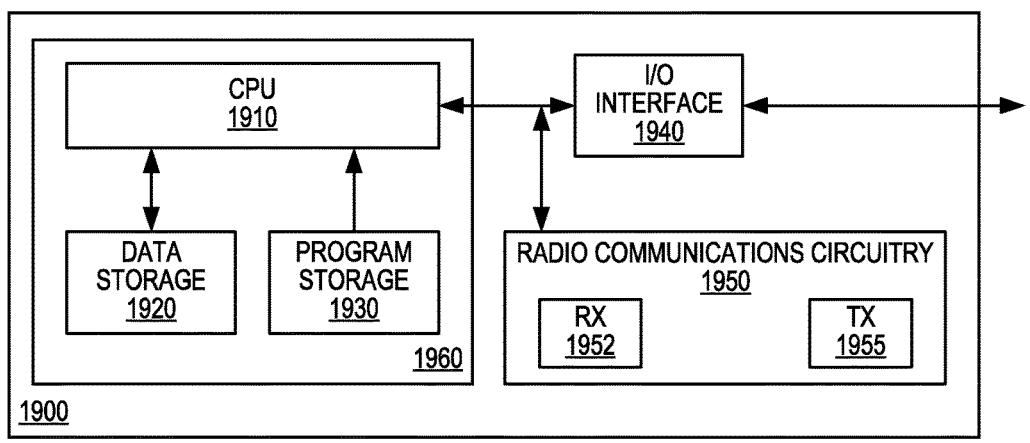
FIG. 19 is a block diagram illustrating an example base station.

FIG. 19 is a schematic illustration of an example wireless node 1900, here embodied as a base station in which a method embodying one or more of the above-described techniques can be implemented. A computer program for controlling the base station to carry out a method embodying the present invention is stored in a program storage 1930, which comprises one or several memory devices. Data used during the performance of a method embodying the present techniques is stored in a data storage 1920, which also comprises one or more memory devices. During performance of a method embodying the present techniques, program steps are fetched from the program storage 1930 and executed by a Central Processing Unit (CPU) 1910, which retrieves data as required from the data storage 1920. Output information resulting from performance of a method embodying the present invention can be stored back in the data storage 1930, or sent to an Input/Output (I/O) interface 1940, which may comprise a transmitter for transmitting data to other nodes, such as an RNC, as required. Likewise, the input/output (I/O) interface 1940 may comprise a receiver for receiving data from other nodes, for example for use by the CPU 1910. The CPU 1910, data storage 1920, and program storage 1930 together make up a processing circuit 1960. Base station 1900 further comprises radio communications circuitry 1950, which includes a receiver circuit 1952 and transmitter circuit 1955 adapted according to well-known designs and techniques to communicate with one or more mobile terminals.

According to several embodiments of the present invention, base station apparatus 1900 generally and radio communications circuitry 1950 more specifically are configured to receive data in receive subframes occurring at defined subframe intervals and having a predetermined number of symbol intervals. Processing circuit 1960 is configured to control the receiver circuit and the transmitter circuit 1955 in radio communications circuitry 1950 to transmit to a second wireless node, via the transmitter circuit 1955, a grant message containing subframe-shortening information, the subframe-shortening information indicating that a subframe transmitted during a first subframe interval by the second wireless node is to be shortened. The processing circuitry 1960 is further configured to receive a first shortened subframe from the second wireless node, via the receiver circuit 1952, during the first subframe interval, where the first shortened subframe is shortened by one or more symbol intervals, relative to the predetermined number of symbol intervals.

Accordingly, in various embodiments of the invention, processing circuits are configured to carry out one or more of the techniques described in detail above. Likewise, other embodiments include base stations including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

The base station 1900 of FIG. 19 may also be understood as an example of a wireless device configured for operation in a wireless communication network and comprising several functional modules, each of which may be implemented using analog and/or digital hardware, or a processing circuit configured with appropriate software and/or firmware, or a combination thereof. For example, in some embodiments a base station comprises a radio communications circuit that includes a transmitter circuit, a receiver circuit for receiving data in transmit subframes occurring at defined subframe intervals and having a predetermined number of symbol intervals, as well as a grant-transmitting circuit for transmitting to a second wireless node, via the transmitter circuit, a grant message containing subframe-shortening information, the subframe-shortening information indicating that a subframe transmitted during a first subframe interval by the second wireless node is to be shortened. A subframe-processing circuit in these embodiments is further arranged to receive a first shortened subframe from the second wireless node, via the receiver circuit, during the first subframe interval, where the first shortened subframe is shortened by one or more symbol intervals, relative to the predetermined number of symbol intervals. It will be appreciated that the several variations described above in connection with the method illustrated in FIG. 17 are equally applicable to the base station implementations described here.

As discussed above, a guard period must always be included in TDD systems, when the UE cannot transmit and receive simultaneously. With puncturing in the downlink signal, all UEs must be aware of this guard period, either by explicit signaling to all UEs or by detection in the UEs. By instead only puncturing the uplink transmissions, as detailed herein, only the UE that transmits in uplink has to be aware of this switch from downlink to uplink. A control message included in the uplink grant provides a very small extra control signaling overhead, and can be received by the UE in a subframe other than the subframe which is punctured. The disclosed techniques thus result in a robust system without the need for detection of the switch from downlink to uplink and with low signaling load.

Examples of several embodiments of the present invention have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a user equipment (UE) configured to transmit data to a base station in subframes of a Time Division Duplex system occurring at defined subframe intervals and having a predetermined number of symbol intervals, the method comprising:
    receiving, from the base station, configuration information defining a set of bit sequences, each bit sequence corresponding to a respective number of non-utilized symbol intervals at the beginning of a subframe interval;
    receiving on a Physical Downlink Control Channel, from the base station, a grant message indicating that the UE is scheduled for transmission in a transmit subframe, the grant message containing one bit sequence out of the set of bit sequences; and,
    transmitting the scheduled transmit subframe in accordance with the grant message by not transmitting, at the beginning of the subframe interval for the scheduled transmit subframe, in the number of non-utilized symbol intervals corresponding to the one bit sequence received in the grant message, and transmitting in symbol intervals during the remainder of the subframe interval.

2. The method of claim 1, further comprising:
    further determining that a further transmit subframe is to be shortened relative to the predetermined number of symbol intervals, by determining that a scheduled broadcast subframe is to be received in a receive subframe preceding and overlapping the further transmit subframe; and,
    in response to said further determining, shortening transmission of the further transmit subframe by not transmitting during one or more symbol intervals at the beginning of a further subframe interval for the further transmit subframe and transmitting during the remainder of the further subframe interval.

3. A method in a base station configured to receive data from a user equipment (UE) in subframes of a Time Division Duplex system occurring at defined subframe intervals and having a predetermined number of symbol intervals, the method comprising:
    transmitting, to the UE, configuration information defining a set of bit sequences, each bit sequence corresponding to a respective number of non-utilized symbol intervals at the beginning of a subframe interval;
    transmitting, to the UE, on a Physical Downlink Control Channel, a grant message indicating that the UE is scheduled for transmission in a subframe during a first subframe interval, the grant message containing one bit sequence out of the set of bit sequences, the one bit sequence corresponding to the number of non-utilized symbol intervals at the beginning of a subframe interval of the scheduled transmit subframe; and
    receiving a first shortened subframe from the UE in accordance with the grant message, during the first subframe interval, wherein the first shortened subframe is shortened, relative to the predetermined number of symbol intervals.

4. The method of claim 3, wherein receiving the first shortened subframe comprises decoding data from the first shortened subframe, wherein said decoding comprises treating one or more omitted symbols at the beginning of the first subframe interval as punctured data.

5. The method of claim 3, wherein receiving the first shortened subframe comprises retrieving decoded data from the first shortened subframe, wherein said retrieving comprises de-mapping data symbols from the first shortened subframe according to a de-mapping pattern that disregards omitted symbol intervals at the beginning of the first subframe interval and decoding the de-mapped data symbols.

6. The method of claim 3, further comprising transmitting a scheduled broadcast subframe during a second subframe interval and receiving a second shortened subframe during a third subframe interval immediately succeeding the second subframe interval.

7. A user equipment (UE), comprising:
    a receiver circuit;
    a transmitter circuit configured to transmit data to a base station in subframes of a Time Division Duplex system occurring at defined subframe intervals and having a predetermined number of symbol intervals; and
    a processing circuit configured to control the receiver circuit and transmitter circuit, wherein the processing circuit is further configured to:
    receive from the base station, via the receiver circuit, configuration information defining a set of bit sequences, each bit sequence corresponding to a respective number of non-utilized symbol intervals at the beginning of a subframe interval;

receive from the base station on a Physical Downlink Control Channel, via the receiver circuit, a grant message indicating that the UE is scheduled for transmission in a transmit subframe, the grant message containing one bit sequence out of the set of bit sequences; and, control the transmitter circuit to transmit the scheduled transmit subframe in accordance with the grant message by not transmitting, at the beginning of the subframe interval for the scheduled transmit subframe, in the number of non-utilized symbol intervals corresponding to the one bit sequence received in the grant message, and transmitting in symbol intervals during the remainder of the subframe interval.

8. The UE of claim 7, wherein the processing circuit is further configured to:

further determine that a further transmit subframe is to be shortened relative to the predetermined number of symbol intervals by determining that a scheduled broadcast subframe is to be received in a receive subframe preceding and overlapping the further transmit subframe; and, in response to said further determination, shorten transmission of the further transmit subframe by not transmitting during one or more symbol intervals at the beginning of a further subframe interval for the further transmit subframe and transmitting during the remainder of the further subframe interval.

9. A base station, comprising:

a transmitter circuit;

a receiver circuit configured to receive data from a user equipment (UE) in subframes of a Time Division Duplex system occurring at defined subframe intervals and having a predetermined number of symbol intervals; and a processing circuit configured to control the receiver circuit and the transmitter circuit, wherein the processing circuit is further configured to:

transmit to the UE, via the transmitter circuit configuration information defining a set of bit sequences, each bit sequence corresponding to a respective number of non-utilized symbol intervals at the beginning of a subframe interval;

transmit to the UE on a Physical Downlink Control Channel, via the transmitter circuit, a grant message indicating that the UE is scheduled for transmission in a subframe during a first subframe interval, the grant message containing one bit sequence out of the set of bit sequences, the one bit sequence corresponding to the number of non-utilized symbol intervals at the beginning of a subframe interval of the scheduled transmit subframe; and receive a first shortened subframe from the UE in accordance with the grant message, via the receiver circuit, during the first subframe interval, wherein the first shortened subframe is shortened, relative to the predetermined number of symbol intervals.

10. The base station of claim 9, wherein the processing circuit is further configured to decode data from the first shortened subframe, wherein said decoding comprises treating one or more omitted symbols at the beginning of the first subframe interval as punctured data symbols.

11. The base station of claim 9, wherein the processing circuit is further configured to retrieve decoded data from the first shortened subframe, wherein said retrieving comprises de-mapping data symbols from the first shortened subframe according to a de-mapping pattern that disregards omitted symbol intervals at the beginning of the first subframe interval and decoding the de-mapped data symbols.

12. The base station of claim 9, wherein the processing circuit is further configured to control the transmitter circuit to transmit a scheduled broadcast subframe during a second subframe interval, and wherein the processing circuit is further configured to receive, via the receiver circuit, a second shortened subframe during a third subframe interval immediately succeeding the second subframe interval.

13. A non-transitory computer-readable medium having a computer program stored thereupon, the computer program comprising computer program code that, when executed by a base station configured to receive data from a user equipment (UE) in subframes of a Time Division Duplex system occurring at defined subframe intervals and having a predetermined number of symbol intervals, causes the base station to perform the steps of:

transmitting, to the UE, configuration information defining a set of bit sequences, each bit sequence corresponding to a respective number of non-utilized symbol intervals at the beginning of a subframe interval;

transmitting, to the UE, on a Physical Downlink Control Channel, a grant message indicating that the UE is scheduled for transmission in a subframe during a first subframe interval, the grant message containing one bit sequence out of the set of bit sequences, the one bit sequence corresponding to the number of non-utilized symbol intervals at the beginning of a subframe interval of the scheduled transmit subframe; and receiving a first shortened subframe from the UE in accordance with the grant message, during the first subframe interval, wherein the first shortened subframe is shortened, relative to the predetermined number of symbol intervals.

14. A non-transitory computer-readable medium having a computer program stored thereupon, the computer program comprising computer program code that, when executed by a user equipment (UE) configured to transmit data to a base station in subframes of a Time Division Duplex system occurring at defined subframe intervals and having a predetermined number of symbol intervals, causes the UE to perform the steps of:

receiving, from the base station, configuration information defining a set of bit sequences, each bit sequence corresponding to a respective number of non-utilized symbol intervals at the beginning of a subframe interval;

receiving on a Physical Downlink Control Channel, from the base station, a grant message indicating that the UE is scheduled for transmission in a transmit subframe, the grant message containing one bit sequence out of the set of bit sequences; and, transmitting the scheduled transmit subframe in accordance with the grant message by not transmitting, at the beginning of the subframe interval for the scheduled transmit subframe, in the number of non-utilized symbol intervals corresponding to the one bit sequence received in the grant message, and transmitting in symbol intervals during the remainder of the subframe interval.

* * * * *